United States Patent
Niu et al.

(10) Patent No.: US 10,841,808 B2
(45) Date of Patent: Nov. 17, 2020

(54) APPARATUS AND MEDIUM FOR ENABLING MULTI-CARRIER OPERATION

(71) Applicant: Apple Inc., Cupertino, CA (US)

(72) Inventors: Huaning Niu, Milpitas, CA (US); Wenting Chang, Beijing (CN); Salvatore Talarico, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/160,650

(22) Filed: Oct. 15, 2018

(65) Prior Publication Data

US 2019/0053064 A1    Feb. 14, 2019

Related U.S. Application Data

(60) Provisional application No. 62/572,904, filed on Oct. 16, 2017, provisional application No. 62/574,084, filed on Oct. 18, 2017.

(51) Int. Cl.
| | |
|---|---|
| *H04W 16/14* | (2009.01) |
| *H04L 5/00* | (2006.01) |
| *H04B 1/713* | (2011.01) |
| *H04W 72/04* | (2009.01) |

(52) U.S. Cl.
CPC ............ *H04W 16/14* (2013.01); *H04B 1/713* (2013.01); *H04L 5/00* (2013.01); *H04W 72/04* (2013.01)

(58) Field of Classification Search
CPC ........ H04W 16/14; H04W 72/04; H04L 5/00; H04B 1/713
See application file for complete search history.

(56) References Cited

U.S. PATENT DOCUMENTS

| | | | |
|---|---|---|---|
| 10,218,406 B2* | 2/2019 | Liu | .................. H04B 1/006 |
| 2005/0272432 A1* | 12/2005 | Ji | .................. H04W 72/082 |
| | | | 455/449 |
| 2011/0075704 A1* | 3/2011 | Bettendorff | ............ H04B 1/713 |
| | | | 375/133 |

(Continued)

FOREIGN PATENT DOCUMENTS

| | | | | |
|---|---|---|---|---|
| WO | WO-2009038545 A1 | * | 3/2009 | ........... H04L 5/0044 |
| WO | WO-2009139724 A1 | * | 11/2009 | ........... H04L 5/0062 |

*Primary Examiner* — Omar J Ghowrwal
(74) *Attorney, Agent, or Firm* — Kowert, Hood, Munyon, Rankin & Goetzel, P.C.

(57) ABSTRACT

Techniques discussed herein are related to Long Term Evolution (LTE) operation in unlicensed spectrum in MulteFire, specifically the Internet of Things (IoT) operating in unlicensed spectrum. One example embodiment can be an apparatus configured to be employed in a User Equipment (UE), comprising: a memory interface; and processing circuitry configured to: perform an initial access to a network over one or more of three dedicated anchor channels; communicate data over a master set of data channels using frequency hopping from one data channel to another data channel of the master set of data channels, wherein a hopping sequence is based on whether or not a carrier sensing procedure succeeds over available ones of the set of data channels; enable a Multi-Carrier Operation (MCO) by defining and allowing transmissions over a new set of data channels different than the master set of data channels; and send the data to a memory via the memory interface.

20 Claims, 13 Drawing Sheets

(56) References Cited

U.S. PATENT DOCUMENTS

| | | | |
|---|---|---|---|
| 2012/0051220 A1* | 3/2012 | Nabetani | H04W 74/0816 370/235 |
| 2012/0250625 A1* | 10/2012 | Kim | H04L 5/001 370/328 |
| 2013/0022053 A1* | 1/2013 | Vasseur | H04L 47/10 370/428 |
| 2016/0344526 A1* | 11/2016 | Fan | H04L 5/0048 |
| 2018/0124789 A1* | 5/2018 | Yerramalli | H04L 67/12 |
| 2018/0279291 A1* | 9/2018 | Tiirola | H04L 1/1861 |
| 2018/0368141 A1* | 12/2018 | Wittenmark | H04W 72/0453 |
| 2019/0174476 A1* | 6/2019 | Chang | H04W 56/001 |
| 2019/0215811 A1* | 7/2019 | Mukherjee | H04W 72/0453 |
| 2019/0239059 A1* | 8/2019 | Koorapaty | H04B 1/7143 |
| 2019/0260530 A1* | 8/2019 | Yl | H04L 5/001 |

\* cited by examiner

APPARATUS AND MEDIUM FOR ENABLING MULTI-CARRIER OPERATION

REFERENCE TO RELATED APPLICATIONS

This application claims the benefit of priority under 35 U.S.C. 119(e) to U.S. Provisional Patent Application Ser. No. 62/572,904, filed Oct. 16, 2017, entitled "MULTI-CARRIER OPERATION FOR ENHANCED MACHINE TYPE COMMUNICATIONS IN UNLICENSED MEDIUM (EMTC-U)" and U.S. Provisional Patent Application Ser. No. 62/574,084, filed Oct. 18, 2017, entitled "MULTI-CARRIER OPERATION FOR ENHANCED MACHINE TYPE COMMUNICATIONS IN UNLICENSED MEDIUM (EMTC-U)", the contents of which are herein incorporated by reference in their entirety.

TECHNICAL FIELD

The present disclosure relates to the field of wireless communications, specifically the Internet of Things (IoT) operating in unlicensed spectrum.

BACKGROUND

Internet of Things (IoT)

IoT is envisioned as a significantly important technology component, which has huge potential, and may change our daily life entirely by enabling connectivity between tons of devices. IoT has wide applications in various scenarios, including smart cities, smart environment, smart agriculture, and smart health systems.

3GPP has standardized two designs to support IoT services—enhanced Machine Type Communication (eMTC) and NarrowBand IoT (NB-IoT). As eMTC and NB-IoT User Equipment (UEs) will be deployed in huge numbers, lowering the cost of these UEs is a key enabler for implementation of IoT. Also, low power consumption is desirable to extend the life time of the battery. In addition, there are substantial use cases of devices deployed deep inside buildings, which would require coverage enhancement in comparison to the defined LTE cell coverage footprint. In summary, eMTC, and NB-IoT techniques are designed to ensure that the UEs have low cost, low power consumption, and enhanced coverage.

DETAILED DESCRIPTION

Figure 1:
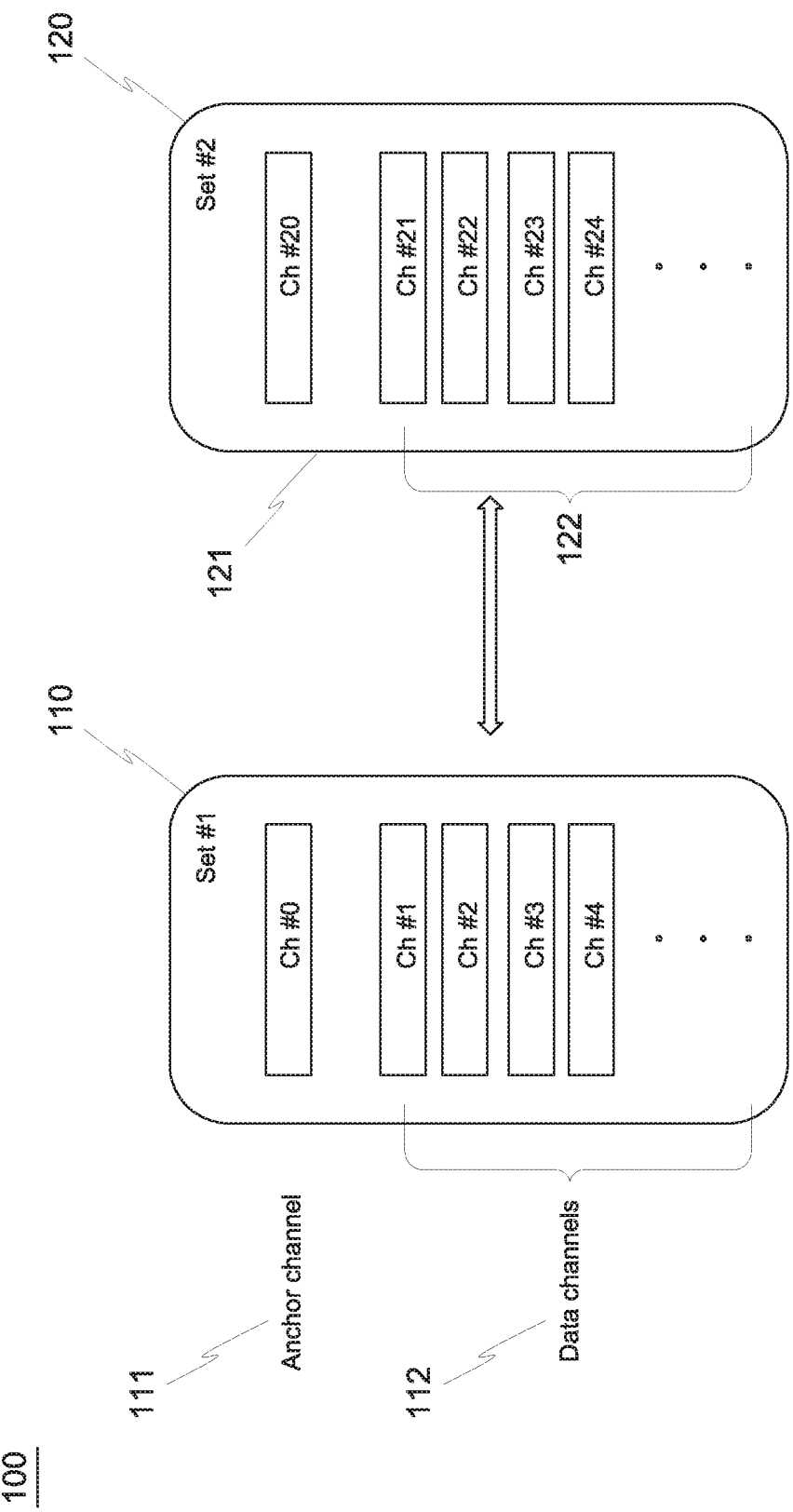
FIG. 1 illustrates an example of Multi-Carrier Operation (MCO) through switching on different sets of channels in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments herein are related to Long Term Evolution (LTE) operation in unlicensed spectrum in MulteFire, specifically the Internet of Things (IoT) operating in unlicensed spectrum.

LTE Operation in Unlicensed Spectrum

Both Rel-13 eMTC and NB-IoT operates in licensed spectrum. On the other hand, the scarcity of licensed spectrum in low frequency band results in a deficit in the data rate boost. Thus, there are emerging interests in the operation of LTE systems in unlicensed spectrum.

Potential LTE operation in unlicensed spectrum includes, but is not limited to the Carrier Aggregation based on Licensed Assisted Access (LAA)/enhanced LAA (eLAA) systems, LTE operation in the unlicensed spectrum via dual connectivity (DC), and the standalone LTE system in the unlicensed spectrum, where LTE-based technology solely operates in unlicensed spectrum without requiring an "anchor" in licensed spectrum—called MulteFire.

To extend the benefits of LTE IoT designs into unlicensed spectrum, MulteFire 1.1 is expected to specify the design for Unlicensed-IoT (U-IoT). The embodiments herein are related to U-IoT systems, with focus on the eMTC based U-IoT design. Note that similar approaches can be used to NB-IoT based U-IoT design as well.

Regulations in Unlicensed Spectrum

The unlicensed frequency band of interest is the 2.4 GHz band, however, the embodiments herein may be applicable to different frequency bands. For global availability, the design should abide by the regulations in different regions, e.g. the regulations given by FCC in US and the regulations given by European Telecommunications Standards Institute (ETSI) in Europe. Based on these regulations, frequency hopping is more appropriate than other forms of modulations, due to more relaxed power spectrum density (PSD) limitation and co-existence with other unlicensed band technology such as BLUETOOTH and WIFI. Specifically, frequency hopping has no PSD limit while other wide band modulations have PSD limit of 10 dBm/MHz in regulations given by ETSI. The low PSD limit would result in limited coverage. Thus, embodiments herein focus on the U-IoT with frequency hopping.

Multi-Carrier Operation in eMTC-U

In eMTC-U the data channel hops from one channel to another, and the hopping sequence depends on whether or not the carrier sensing procedure succeeds over the available channels. In this scenario, Multi-Carrier Operation (MCO) could be enabled, but particular care shall to be taken. Therefore, embodiments herein include designs and mechanisms to enable MCO for eMTC-U systems. Embodiments herein also provide support multi-carrier operation in eMTC-U systems.

Multi-Carrier Operation

In legacy LTE, in order to improve traffic capacity Multi-Carrier Operation (MCO) allows a UE operating in bandwidth reduced/low complexity (BL) mode to receive/transmit unicast transmission on a different carrier of that from which it has initially performed initial access, which is defined as the anchor carrier. In LTE-legacy, MCO is supported for both NB-IoT and eMTC. In NB-IoT Rel-13, MCO is supported for in-band, guard band, and standalone mode operation, with some exception and general rules. For instance, in in-band operation it is precluded to transmit narrowband primary synchronization signal (NPSS)/narrowband secondary synchronization signal (NSSS)/narrowband Physical broadcast channel (NPBCH) in the Physical Resource Block (PRB) that contains LTE primary synchronization signal (PSS)/secondary synchronization signal (SSS)/physical broadcast channel (PBCH). Furthermore, there is no support for MCO for standalone mode with either guard-band or in-band mode of operation, and as general rule the total span cannot exceed 110 PRBs. Standalone/standalone is allowed with the constraint that time alignment error shall not exceed the minimum requirement for intra-band contiguous carrier aggregation between the two carriers.

For either eMTC or NB-IoT, the additional carriers used for MCO for all unicast transmissions are configured via UE-specific Radio Resource Control (RRC) signaling. If a different carrier is not configured, all the transmission will occur in the carrier where the UE has initially received PSS/SSS/PBCH and SI transmissions. After the random access procedure succeeds, if the UE cannot be RRC configured, the UE uses the previously configured RRC configuration, and it monitors the USS in the previously configured carrier. The configured carrier is exclusively used for unicast transmission and not for initial access or other types of multicast transmissions. For NB-IoT carrier, on PRBs different than the NB-IoT anchor carrier the mapping of narrowband Physical Downlink Control Channel (NPDCCH)/narrowband Physical Downlink Shared Channel (NPDSCH) symbols to Resource Elements (REs) occurs without consideration of NPSS/NSSS/NPBCH, and the carrier are usually unnecessary to satisfy the 100 kHz channel raster requirements. For idle mode, the UE always camps on the carrier on which the UE has received PSS/SSS/PBCH and SI messages.

EXAMPLE EMBODIMENTS

In eMTC-U, the initial access is performed over one or more of the three dedicated anchor channels, and 56 data channels are available. Given set of data channels (e.g., 15 data channels), the system hops from one data channel to another, and the hopping sequence depends on whether or not the carrier sensing procedure succeeds over the available channels. In this scenario, MCO could be enabled, but particular care shall to be taken. In various embodiments, two different options may be used to enable MCO for eMTC-U systems. A similar approach might be also used to support MCO for NB-IoT systems operating on unlicensed spectrum.

Embodiment 1—UE Operating Over Different Hopping Sets

FIG. 1 illustrates an example 100 of Multi-Carrier Operation (MCO) through switching on different sets of channels in accordance with some embodiments. In this embodiment, MCO is enabled by defining and allowing transmissions over a different set of data channels, which is initially configured and might be contained in the whitelist within the essential System Information Block (SIB) that can be transmitted in the anchor channel 111 (i.e. Ch #0) called here master set 110, to another new set 120 of data channels 122, which might also include a new anchor channel 121 (i.e. Ch #20), as illustrated in FIG. 1. In embodiments, the new set 120 of data channels 122 can operate concurrently with the master set 110 of data channels 112, or they can operate one at the time. In embodiments, since SI/paging might not be contained in the anchor channel 111, the new set 120 of data channels 122 can contain a new anchor channel 121 as well, or the master anchor channel 111 can still be used to determine their presence, while the new data channels 122 might only be a shifted version in frequency of one contained in the master set 110, and the shift in frequency is indicated by a given offset value which is RRC configured or predefined.

In embodiments, the new set of channels in which the UE might transmit/receive unicast transmissions is configured through RRC signaling, which might be UE or cell-specifically configured. In embodiments, the new available set of data channels is orthogonal and do not overlap with the originally configured set of channels. In embodiments, given a set of data/anchor channels over which the UE initially operates, a UE makes use of new carriers, which are defined within a new orthogonal set, that is uniquely indicated among a total of N orthogonally defined (sets of) channels. In embodiments, the new set of operating carriers is obtained as $mod(\Omega+\Delta_{offset}, 56)$, where $\Omega$ is a set of data channels on which the UE operates on, and is allowed to hop to, and $\Delta_{offset}$ is a configurable offset. One of the drawbacks of this approach is that collisions might occur with the additional carriers, unless the additional set of operating carriers is orthogonal to the hopping set. In embodiments, if the carriers collide with each other, and the collision is related to the anchor channel, the non-anchor channel carriers are dropped. In case non-anchor channels collide each other, it will be up to the eNB's implementation on how to schedule the channels and avoid collisions. In embodiments, one or more additional set of channels can be operated.

Embodiment 2—MCO within the Master Hopping Set

Figure 2A:
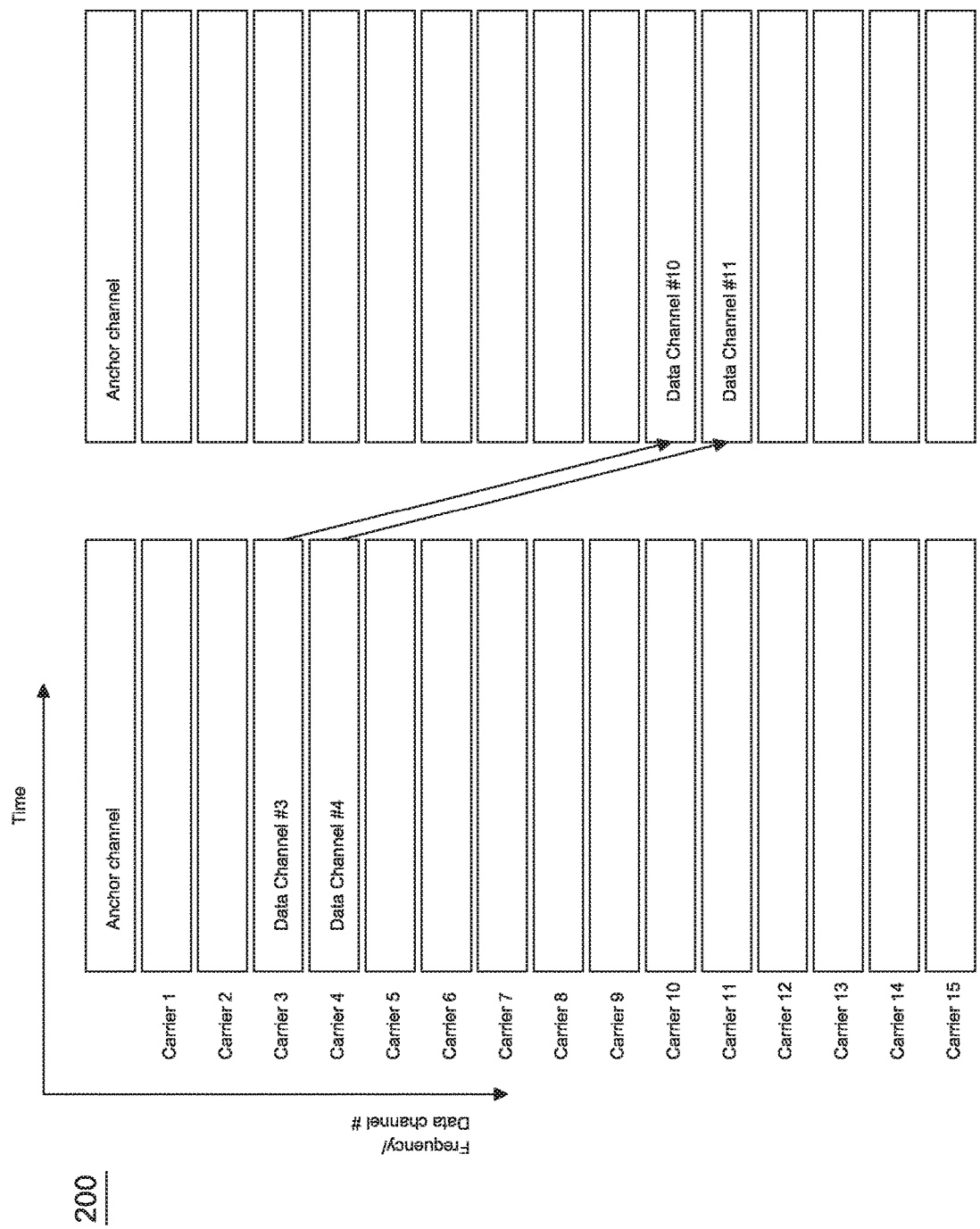
FIG. 2A illustrates an example of additional carrier in a continuous manner within the hopping set in accordance with some embodiments.
Figure 2B:
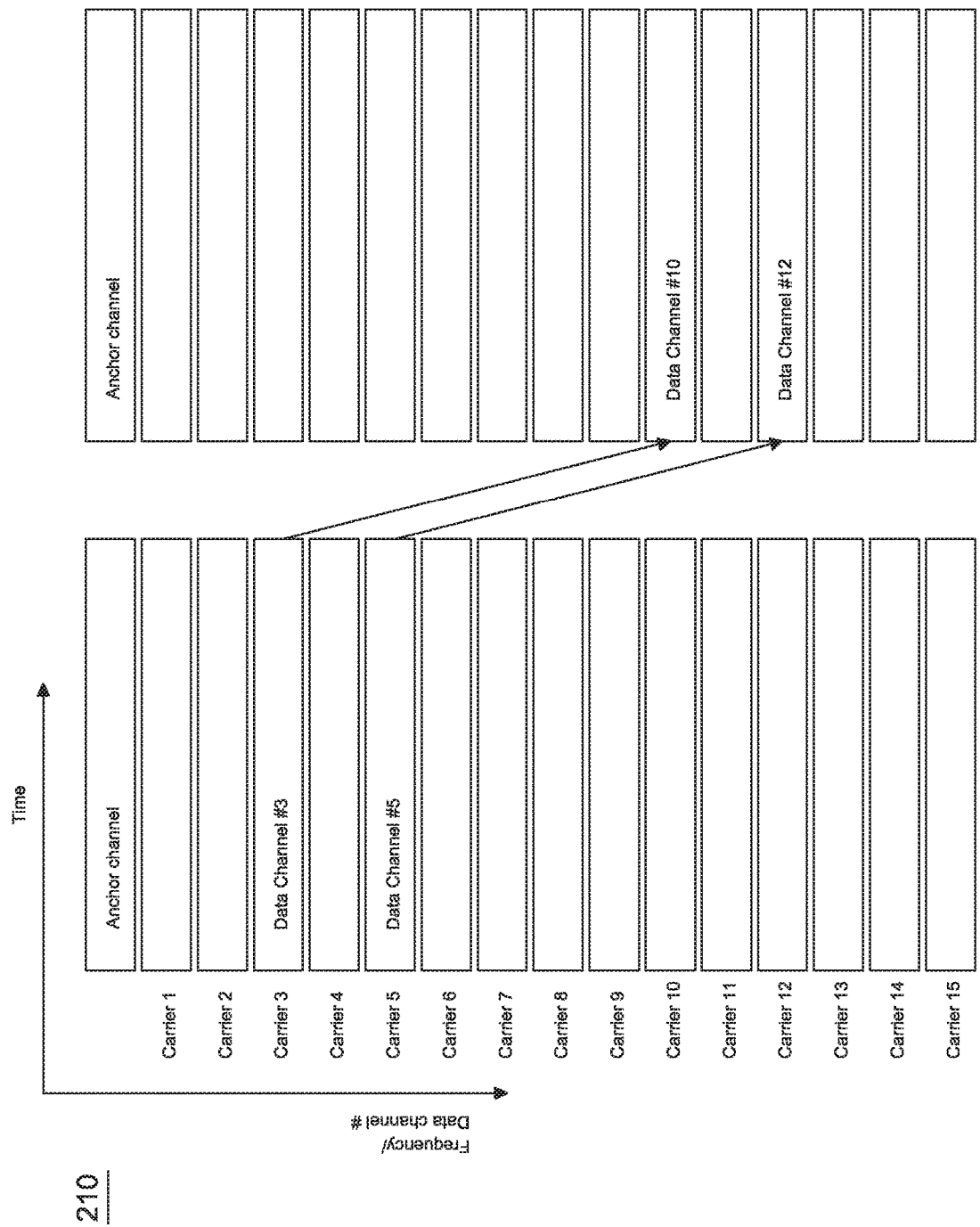
FIG. 2B illustrates an example of additional carrier in a distributed manner within the hopping set in accordance with some embodiments.

In embodiments, MCO in the unlicensed system is adapted from legacy MCO. FIG. 2A illustrates an example 200 of additional carrier in a continuous manner within the hopping set in accordance with some embodiments. In this embodiment, at a given point in time one or more carriers can be enabled within the hopping set. In embodiments, the additional carriers of operation are defined within the available set of data channels in a continuous manner in the adjacency of the channel in which the UE has hopped to. For instance, given a system that operates on a given set of data channels (e.g., data channel #1 to data channel #15), and that at a given point in time hops to the data channel #4, the additional carrier on which this can operate while in this channel can be data channel #3 and/or data channel #5. In embodiments, regardless of the main set of channels on which the UE is defined to operate to, one or more additional carriers are defined every times the system hops to a different data channel such that they are contiguous in frequency to this. The drawback of this approach is that this would results in introducing adjacent channel interference due to power spill from one carrier to the one(s) in direct adjacency, especially for those that are surrounded from both sides by active carriers. FIG. 2B illustrates an example 210 of additional carrier in a distributed manner within the hopping set in accordance with some embodiments. In this embodiment, the additional carriers are not defined in a contiguous manner, and always follow an offset value that is kept constant between hops, such that the operating carriers are always spaced apart equally. In embodiments, the additional carriers can be defined through RRC signaling by providing the offset value, which can be UE or cell specifically defined. In embodiments, the offset might be predefined, while MCO is still configured/enabled through RRC signaling. In embodiments, MCO is not enabled, for those data channels that carry SI/paging, which can be find indicated within the anchor channel.

Figure 3:
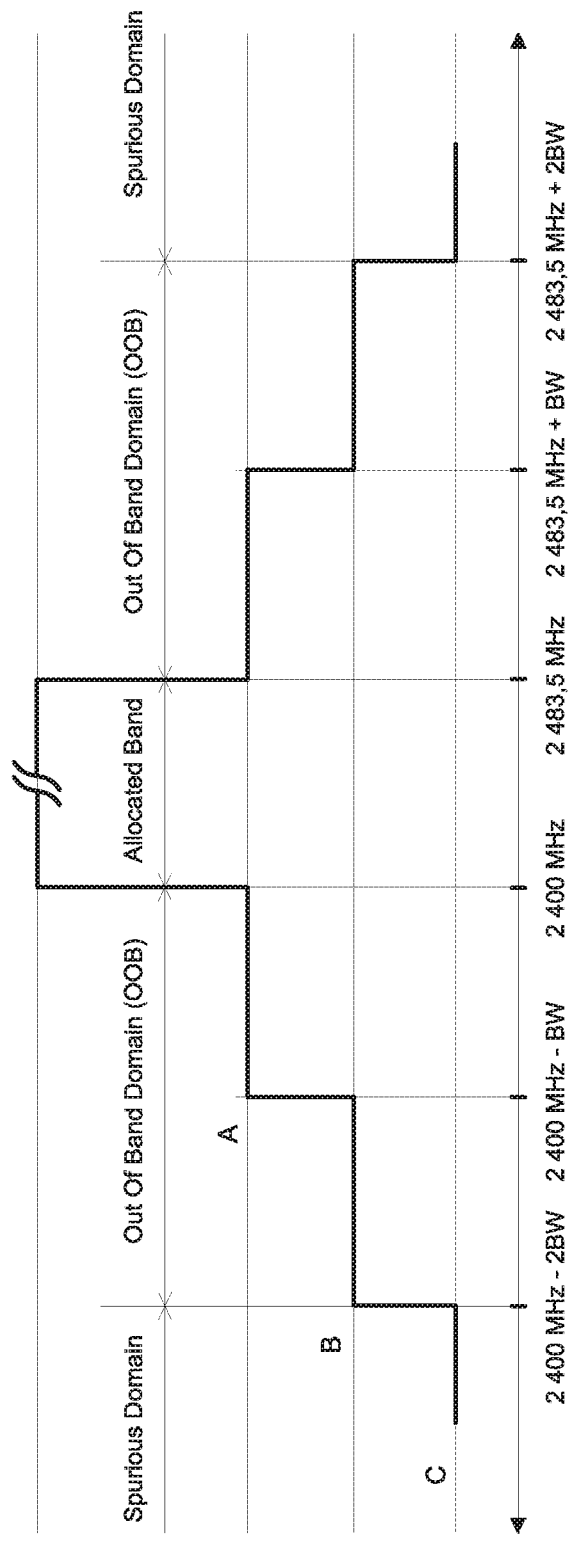
FIG. 3 illustrates an example of a transmission mask for out-of-band (OOB) emissions in accordance with some embodiments.

As shown in FIG. 3, which illustrates an example 300 of a transmission mask for out-of-band (OOB) emissions in accordance with some embodiments. For this option, EU regulations (see e.g., ETSI EN 300 228) may constrain the occupancy probability for each frequency to be between $(1/N) \times 25\%$ and 77%, where N is the total number of hopping frequencies in use, and a minimum separation between channels of 100 KHz. EU regulation provides also some additional limitation for either out-of-band (OOB) and spurious emissions. In particular for OOB emissions, the regulation provides a transmission mask with the maximum emission power that is tolerated. However, according to these rules, one or more carries can be used for MCO within the hopping set, if the number of channels available is sufficiently large.

Configuration/Activation of SCell

In embodiments, the Secondary Cell (SCell) has a dedicated anchor channel, which is used to provide the UE with information regarding the cell ID and the white-list information for the data channels used, similarly as the Primary Cell (PCell). In embodiments, given the whitelist for the PCell, the hopping sequence for the Scell can be derived from the knowledge of its Physical Cell Identify (PCI) of the SCell and a System Frame Number (SFN). In embodiments, this information may be provided through broadcasting of SIB-x, which is transmitted in the data channel, and provides the remaining SIB information other than the essential SIB transmitted on the anchor channel. In embodiments, the SCell is added/configured or reconfigured through RRC signaling and one anchor channel is used for both PCell and SCell. In embodiments, before activation of the SCell, the eNB provides to the UE a RRCConnectionReonfiguration message, through which the SCell is added/configured or reconfigured. In embodiments, this message may include one or more of the following fields:

Cell index as well as cell identification for the SCell;
Whitelist of the channels used by the SCell—if the new whitelist is only a frequency shift of the whitelist for the PCell, the offset shall be indicated;
Hyper-frame structure used in the data channels used by the SCell, if the hyper-frame structure is different than that for the PCell;
Paging indicator, which provides information on whether paging is transmitted in the data channels for Scell, with the same occurrence of the PCell, which is indicated within the anchor of the PCell;
Downlink and System Information (SI) configuration parameters;
SIB indication to denote whether or not SIB is transmitted in the SCell's dedicated data channels with the same occurrence than PCell, which is indicated within the anchor of the PCell; and
ScellDeactivationTimer, which is a timer that can be used to trigger deactivation.

In embodiments, similarly to LTE the SCell is activated via MAC CE, while deactivation is done via Media Access Control (MAC) Control Element (CE) and/or according to the expiration of a timer that triggers the deactivation if the amount of time the UE has not received any data from the SCell exceeds ScellDeactivationTimer.

Figure 4:
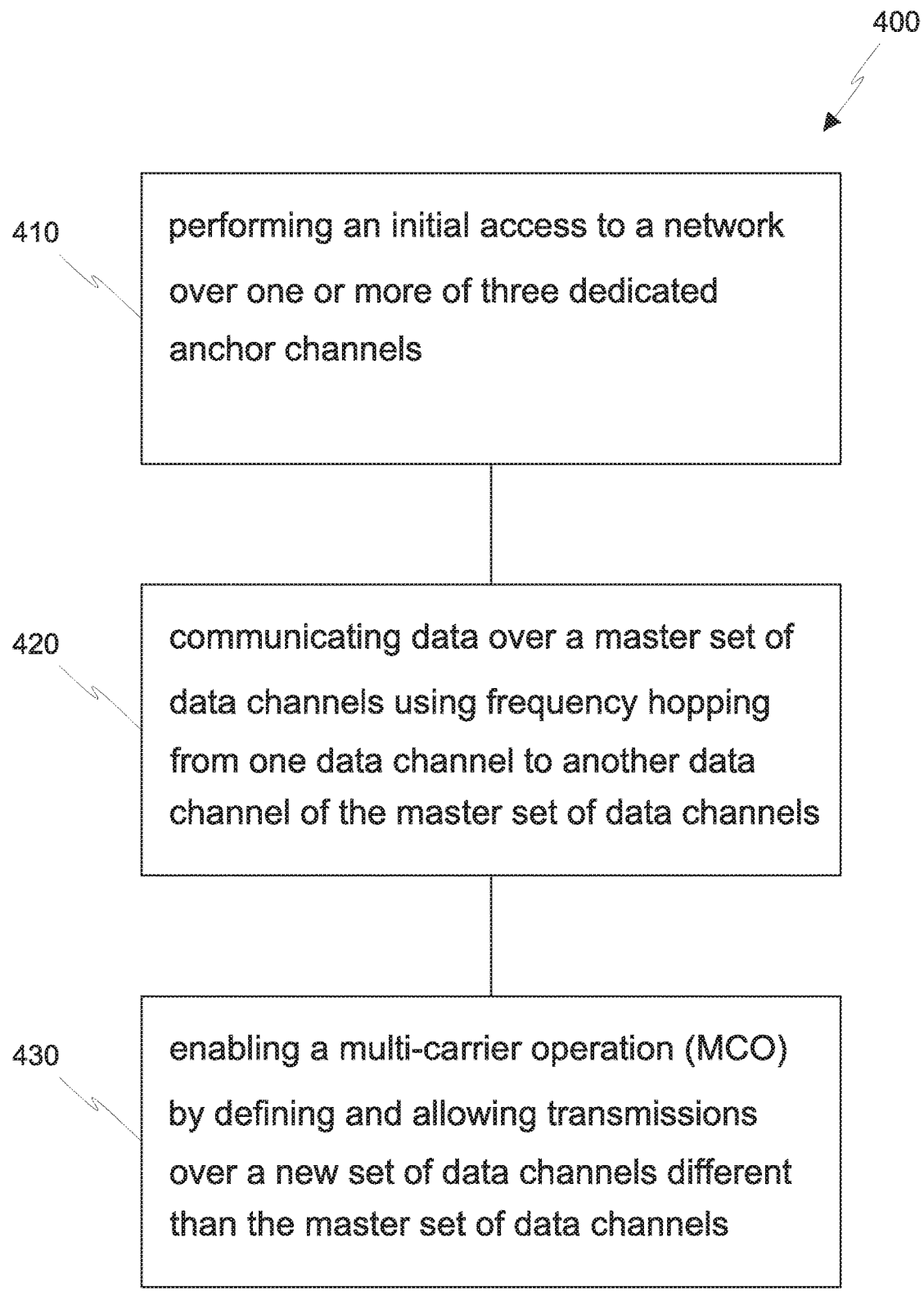
FIG. 4 is a flow diagram of an example method employable at a UE that enables Multi-Carrier Operation (MCO) for unlicensed enhanced Machine-Type Communications (eMTC-U) systems in accordance with some embodiments.

FIG. 4 illustrates a flow diagram of an example method 400 employable at a UE that enables Multi-Carrier Operation (MCO) for unlicensed enhanced Machine-Type Communications (eMTC-U) systems in accordance with some embodiments. In other aspects, a machine readable medium can store instructions associated with method 400 that, when executed, can cause a UE to perform the acts of method 400.

The method 400 may include, at 410, performing an initial access to a network over one or more of three dedicated anchor channels.

The method 400 may further include, at 420, communicating data over a master set of data channels using frequency hopping from one data channel to another data channel of the master set of data channels, wherein a hopping sequence is based on whether or not a carrier sensing procedure succeeds over available ones of the set of data channels.

The method 400 may further include, at 430, enabling a Multi-Carrier Operation (MCO) by defining and allowing transmissions over a new set of data channels different than the master set of data channels. In an embodiment, the new set of channels is a shifted version in frequency of one contained in the master set, and the shift in frequency is indicated by a given offset value which is RRC configured or predefined. In an embodiment, the configuration is a User Equipment (UE)-specific configuration or a cell-specific configuration. In an embodiment, the MCO is enabled by operating one or more carriers within a hopping set. In an embodiment, additional carriers of operation are defined in a continuous manner in the adjacency of the channel in which the UE has hopped to. In an embodiment, additional carriers of operation are defined in a non-contiguous manner and follow an offset value that is kept constant between hops such that the operating carriers are always spaced apart equally, wherein the offset value is predefined or configured through RRC signaling, wherein the configuration is a UE-specific configuration or a cell-specific configuration. In an embodiment, a Secondary Cell (SCell) is activated either through a dedicated anchor channel or through RRC signaling with only one anchor channel for both a Primary Cell (PCell) and the SCell. In an embodiment, before activation of the SCell, a RRCConnectionReconfiguration message is used to indicate that the SCell is to be added/configured or reconfigured. In an embodiment, the RRCConnectionReconfiguration message includes additional information such as a whitelist of channels used by the SCell, or a frequency shift adopted over the whitelist for the PCell, a hyper-frame structure used in the data channels used by the SCell when the hyper-frame structure is different than that for the PCell.

In an embodiment, the SCell is activated via Media Access Control (MAC) Control Element (CE), and deactivation is done via MAC CE and/or according to expiration of a ScellDeactivationTimer. In an embodiment, the hopping sequence for the Scell is derived from Physical Cell Identify (PCI) of the Scell and a System Frame Number (SFN). In an embodiment, the information related to the hopping sequence for the SCell are provided through broadcasting of SIB-x, which is transmitted in the data channel, and provides the remaining SIB information other than the essential SIB transmitted on the anchor channel.

Figure 5:
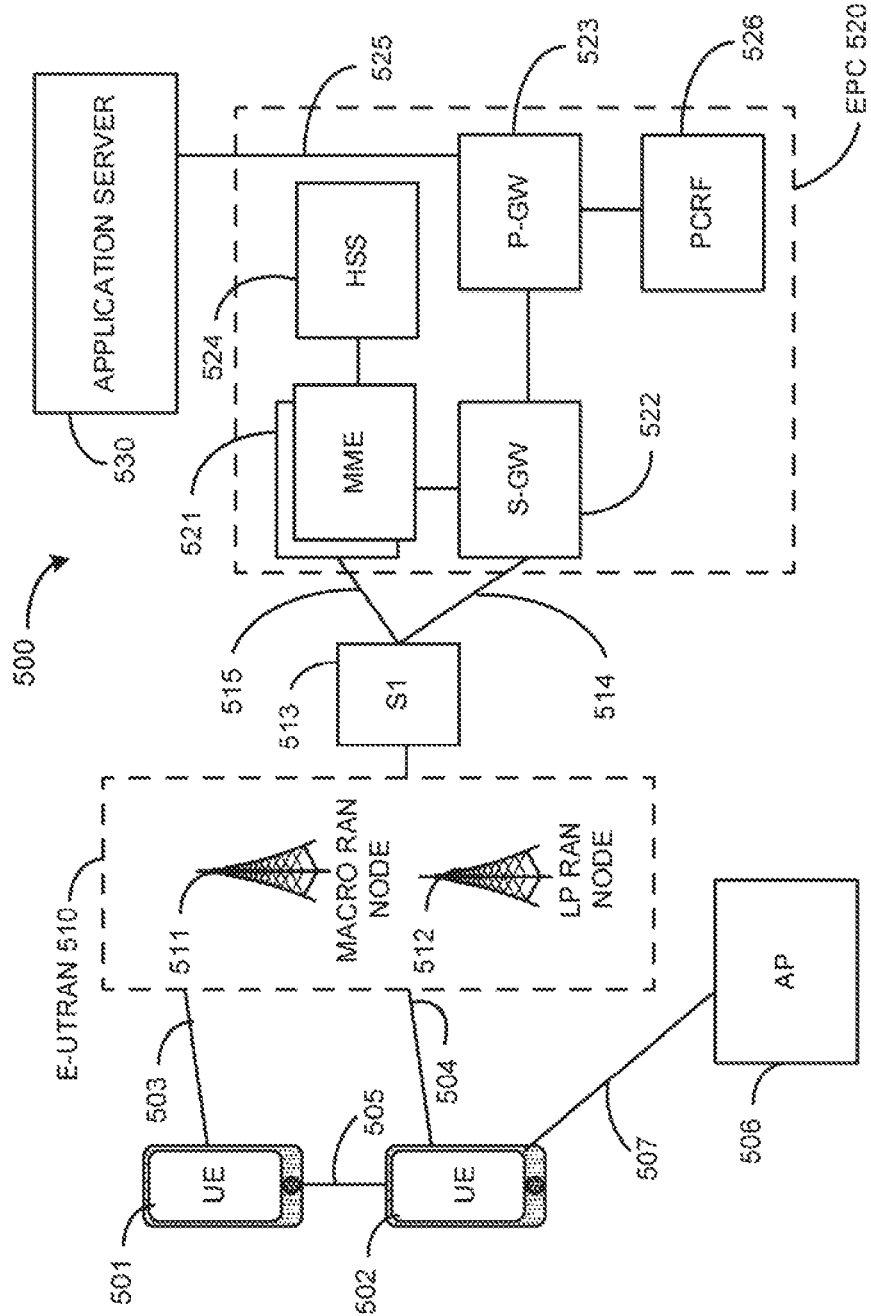
FIG. 5 illustrates an architecture of a system of a network in accordance with some embodiments.

FIG. 5 illustrates an architecture of a system 500 of a network in accordance with some embodiments. The system 500 is shown to include a User Equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN). Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the SI-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the SI interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
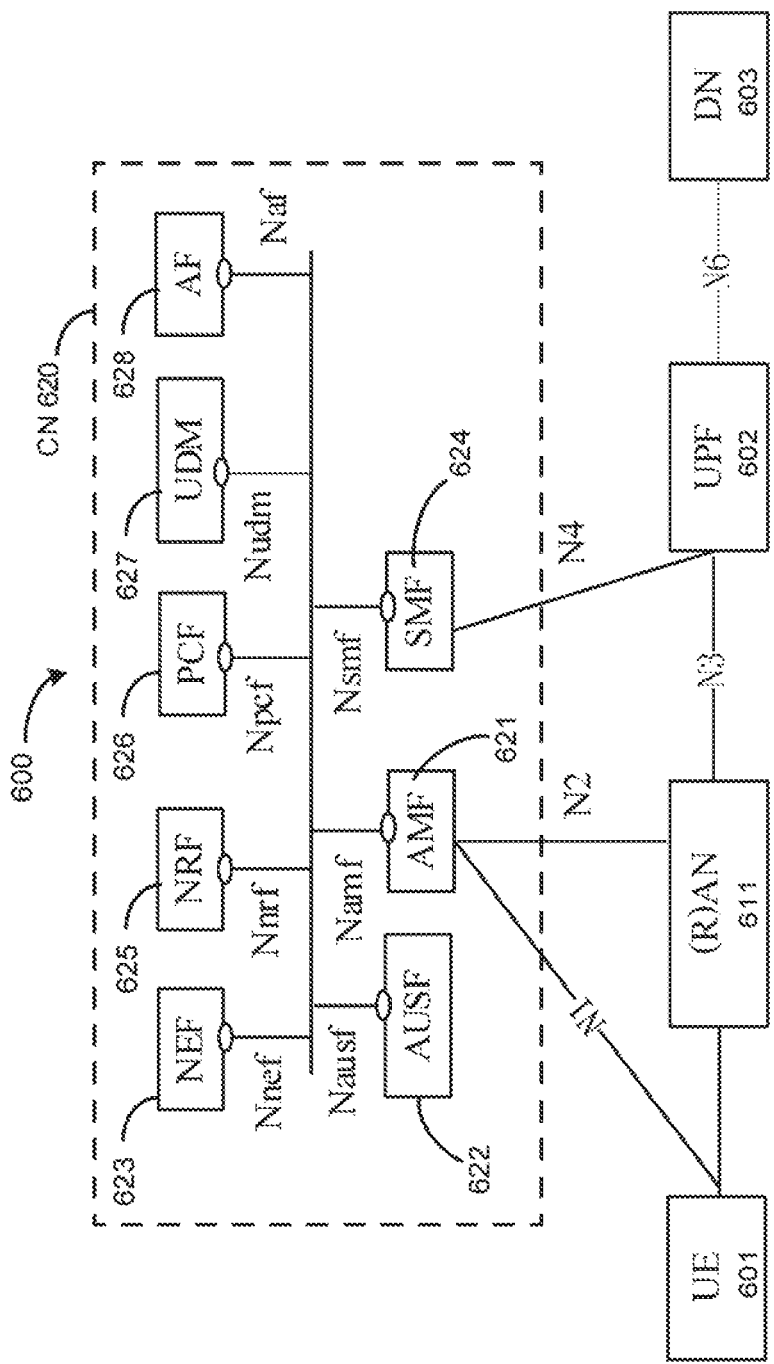
FIG. 6 illustrates an architecture of a system of a network in accordance with some embodiments.

FIG. 6 illustrates an architecture of a system 600 of a network in accordance with some embodiments. The system 600 is shown to include a UE 601, which may be the same or similar to UEs 501 and 502 discussed previously; a RAN node 611, which may be the same or similar to RAN nodes 511 and 512 discussed previously; a User Plane Function (UPF) 602; a Data network (DN) 603, which may be, for example, operator services, Internet access or 3rd party services; and a 5G Core Network (5GC or CN) 620.

The CN 620 may include an Authentication Server Function (AUSF) 622; a Core Access and Mobility Management Function (AMF) 621; a Session Management Function (SMF) 624; a Network Exposure Function (NEF) 623; a Policy Control function (PCF) 626; a Network Function (NF) Repository Function (NRF) 625; a Unified Data Management (UDM) 627; and an Application Function (AF)

628. The CN 620 may also include other elements that are not shown, such as a Structured Data Storage network function (SDSF), an Unstructured Data Storage network function (UDSF), and the like.

The UPF 602 may act as an anchor point for intra-RAT and inter-RAT mobility, an external PDU session point of interconnect to DN 603, and a branching point to support multi-homed PDU session. The UPF 602 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 602 may include an uplink classifier to support routing traffic flows to a data network. The DN 603 may represent various network operator services, Internet access, or third party services. NY 603 may include, or be similar to application server 530 discussed previously.

The AUSF 622 may store data for authentication of UE 601 and handle authentication related functionality. The AUSF 622 may facilitate a common authentication framework for various access types.

The AMF 621 may be responsible for registration management (e.g., for registering UE 601, etc.), connection management, reachability management, mobility management, and lawful interception of AMF-related events, and access authentication and authorization. AMF 621 may provide transport for SM messages between and SMF 624, and act as a transparent proxy for routing SM messages. AMF 621 may also provide transport for short message service (SMS) messages between UE 601 and an SMS function (SMSF) (not shown by FIG. 6). AMF 621 may act as Security Anchor Function (SEA), which may include interaction with the AUSF 622 and the UE 601, receipt of an intermediate key that was established as a result of the UE 601 authentication process. Where USIM based authentication is used, the AMF 621 may retrieve the security material from the AUSF 622. AMF 621 may also include a Security Context Management (SCM) function, which receives a key from the SEA that it uses to derive access-network specific keys. Furthermore, AMF 621 may be a termination point of RAN CP interface (N2 reference point), a termination point of NAS (N1) signalling, and perform NAS ciphering and integrity protection.

AMF 621 may also support NAS signalling with a UE 601 over an N3 interworking-function (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE 601 and AMF 621, and relay uplink and downlink user-plane packets between the UE 601 and UPF 602. The N3IWF also provides mechanisms for IPsec tunnel establishment with the UE 601.

The SMF 624 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 624 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signalling for PDU session authorization/authentication by external DN.

The NEF 623 may provide means for securely exposing the services and capabilities provided by 3GPP network functions for third party, internal exposure/re-exposure, Application Functions (e.g., AF 628), edge computing or fog computing systems, etc. In such embodiments, the NEF 623 may authenticate, authorize, and/or throttle the AFs. NEF 623 may also translate information exchanged with the AF 628 and information exchanged with internal network functions. For example, the NEF 623 may translate between an AF-Service-Identifier and an internal 5GC information. NEF 623 may also receive information from other network functions (NFs) based on exposed capabilities of other network functions. This information may be stored at the NEF 623 as structured data, or at a data storage NF using a standardized interfaces. The stored information can then be re-exposed by the NEF 623 to other NFs and AFs, and/or used for other purposes such as analytics.

The NRF 625 may support service discovery functions, receive NF Discovery Requests from NF instances, and provide the information of the discovered NF instances to the NF instances. NRF 625 also maintains information of available NF instances and their supported services.

The PCF 626 may provide policy rules to control plane function(s) to enforce them, and may also support unified policy framework to govern network behaviour. The PCF 626 may also implement a front end (FE) to access subscription information relevant for policy decisions in a UDR of UDM 627.

The UDM 627 may handle subscription-related information to support the network entities' handling of communication sessions, and may store subscription data of UE 601. The UDM 627 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 626. UDM 627 may also support SMS management, wherein an SMS-FE implements the similar application logic as discussed previously.

The AF 628 may provide application influence on traffic routing, access to the Network Capability Exposure (NCE), and interact with the policy framework for policy control. The NCE may be a mechanism that allows the 5GC and AF 628 to provide information to each other via NEF 623, which may be used for edge computing implementations. In such implementations, the network operator and third party services may be hosted close to the UE 601 access point of attachment to achieve an efficient service delivery through the reduced end-to-end latency and load on the transport network. For edge computing implementations, the 5GC may select a UPF 602 close to the UE 601 and execute traffic steering from the UPF 602 to DN 603 via the N6 interface. This may be based on the UE subscription data, UE location, and information provided by the AF 628. In this way, the AF 628 may influence UPF (re)selection and traffic routing. Based on operator deployment, when AF 628 is considered to be a trusted entity, the network operator may permit AF 628 to interact directly with relevant NFs.

As discussed previously, the CN 620 may include an SMSF, which may be responsible for SMS subscription checking and verification, and relaying SM messages to/from the UE 601 to/from other entities, such as an SMS-GMSC/IWMSC/SMS-router. The SMS may also interact with AMF 621 and UDM 627 for notification procedure that the UE 601 is available for SMS transfer (e.g., set a UE not reachable flag, and notifying UDM 627 when UE 601 is available for SMS).

The system 600 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 600 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 620 may include an Nx interface, which is an inter-CN interface between the MME (e.g., MME 521) and the AMF 621 in order to enable interworking between CN 620 and CN 520.

Although not shown by FIG. 6, system 600 may include multiple RAN nodes 611 wherein an Xn interface is defined between two or more RAN nodes 611 (e.g., gNBs and the like) that connecting to 5GC 620, between a RAN node 611 (e.g., gNB) connecting to 5GC 620 and an eNB (e.g., a RAN node 511 of FIG. 5), and/or between two eNBs connecting to 5GC 620.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
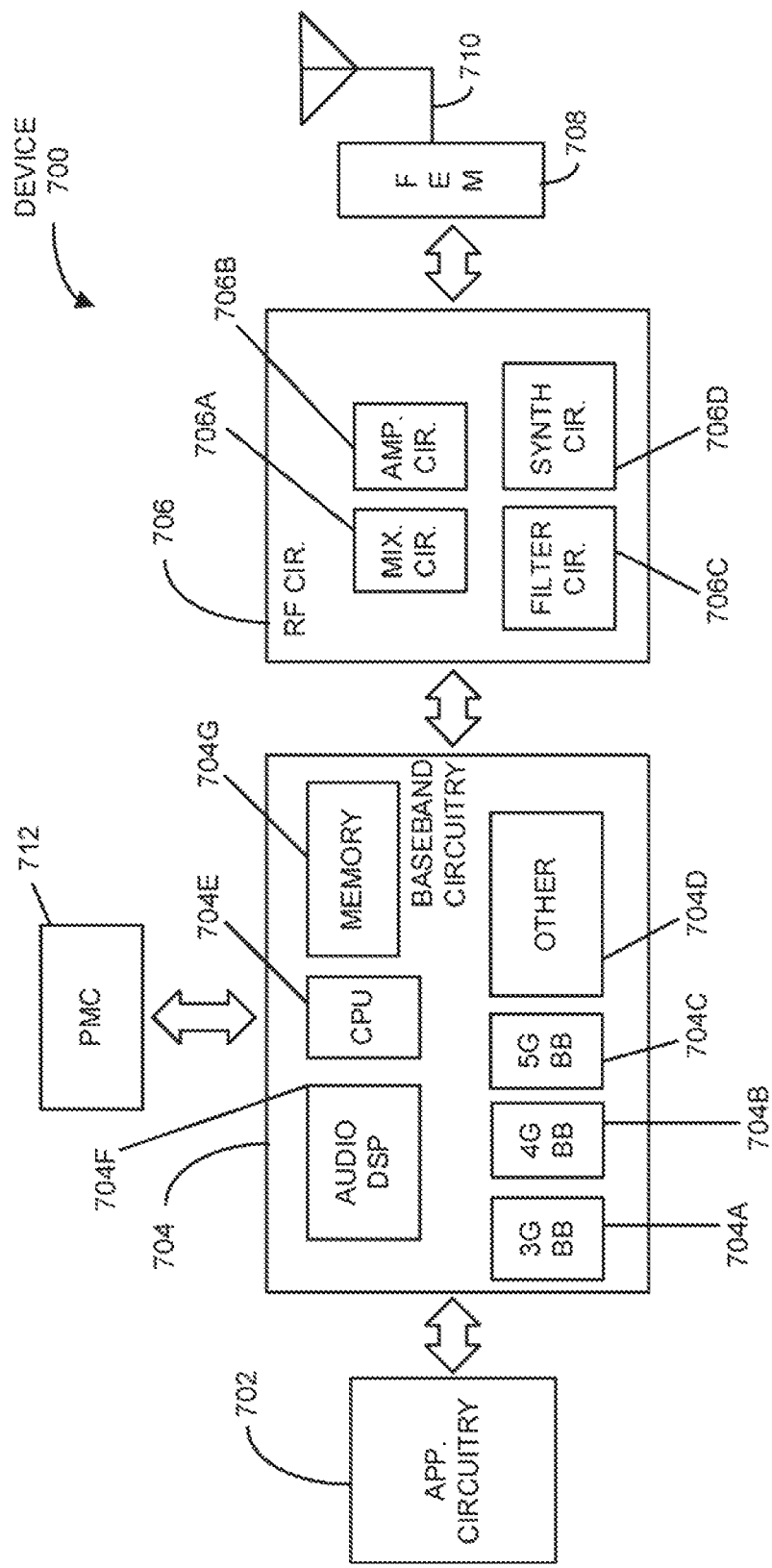
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it will transmit back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a Radio Resource Control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
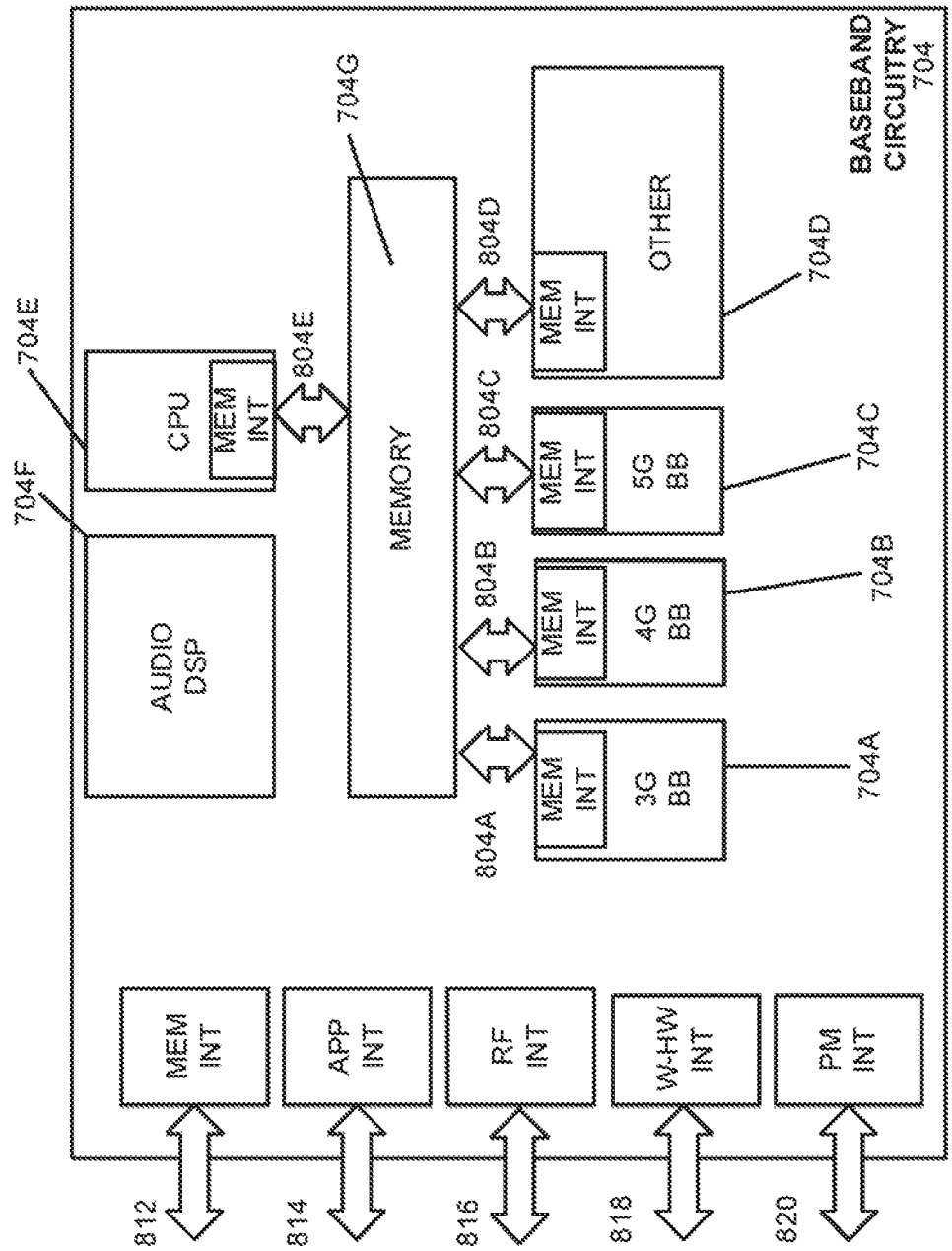
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Figure 9:
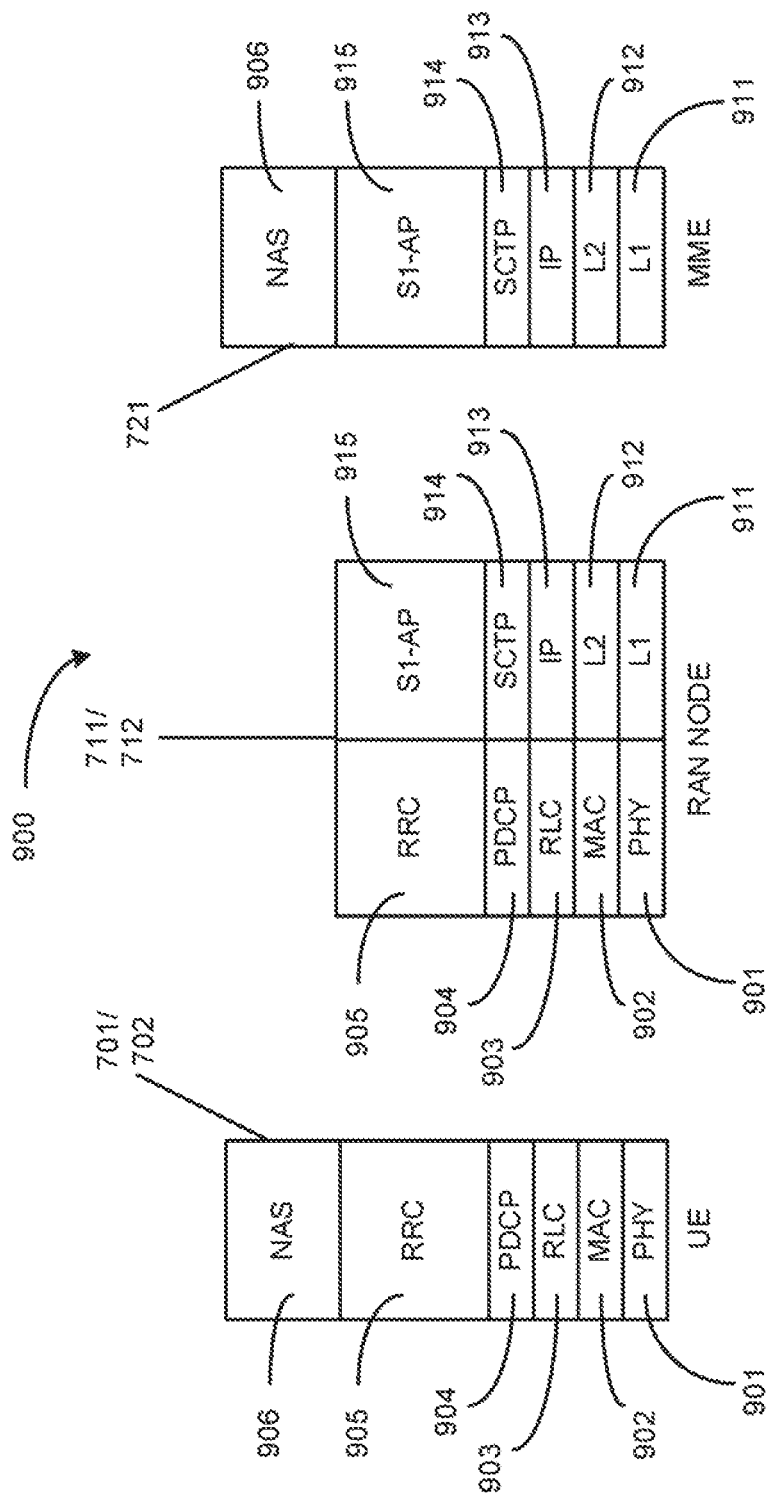
FIG. 9 is an illustration of a control plane protocol stack in accordance with some embodiments.

FIG. 9 is an illustration of a control plane protocol stack in accordance with some embodiments. In this embodiment, a control plane 900 is shown as a communications protocol stack between the UE 501 (or alternatively, the UE 502), the RAN node 511 (or alternatively, the RAN node 512), and the MME 521.

The PHY layer 901 may transmit or receive information used by the MAC layer 902 over one or more air interfaces. The PHY layer 901 may further perform link adaptation or adaptive modulation and coding (AMC), power control, cell search (e.g., for initial synchronization and handover purposes), and other measurements used by higher layers, such as the RRC layer 905. The PHY layer 901 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 902 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 903 may operate in a plurality of modes of operation, including: Transparent Mode (TM), Unacknowledged Mode (UM), and Acknowledged Mode (AM). The RLC layer 903 may execute transfer of upper layer protocol data units (PDUs), error correction through automatic repeat request (ARQ) for AM data transfers, and concatenation, segmentation and reassembly of RLC SDUs for UM and AM data transfers. The RLC layer 903 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 904 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 905 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 901, the MAC layer 902, the RLC layer 903, the PDCP layer 904, and the RRC layer 905.

The non-access stratum (NAS) protocols 906 form the highest stratum of the control plane between the UE 501 and the MME 521. The NAS protocols 906 support the mobility of the UE 501 and the session management procedures to establish and maintain IP connectivity between the UE 501 and the P-GW 523.

The S1 Application Protocol (S1-AP) layer 915 may support the functions of the S1 interface and comprise Elementary Procedures (EPs). An EP is a unit of interaction between the RAN node 511 and the CN 520. The SI-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 914 may ensure reliable delivery of signaling messages between the RAN node 511 and the MME 521 based, in part, on the IP protocol, supported by the IP layer 913. The L2 layer 912 and the L1 layer 911 may refer to communication links (e.g., wired or wireless) used by the RAN node and the MME to exchange information.

The RAN node 511 and the MME 521 may utilize an S1-MME interface to exchange control plane data via a protocol stack comprising the LI layer 911, the L2 layer 912, the IP layer 913, the SCTP layer 914, and the SI-AP layer 915.

Figure 10:
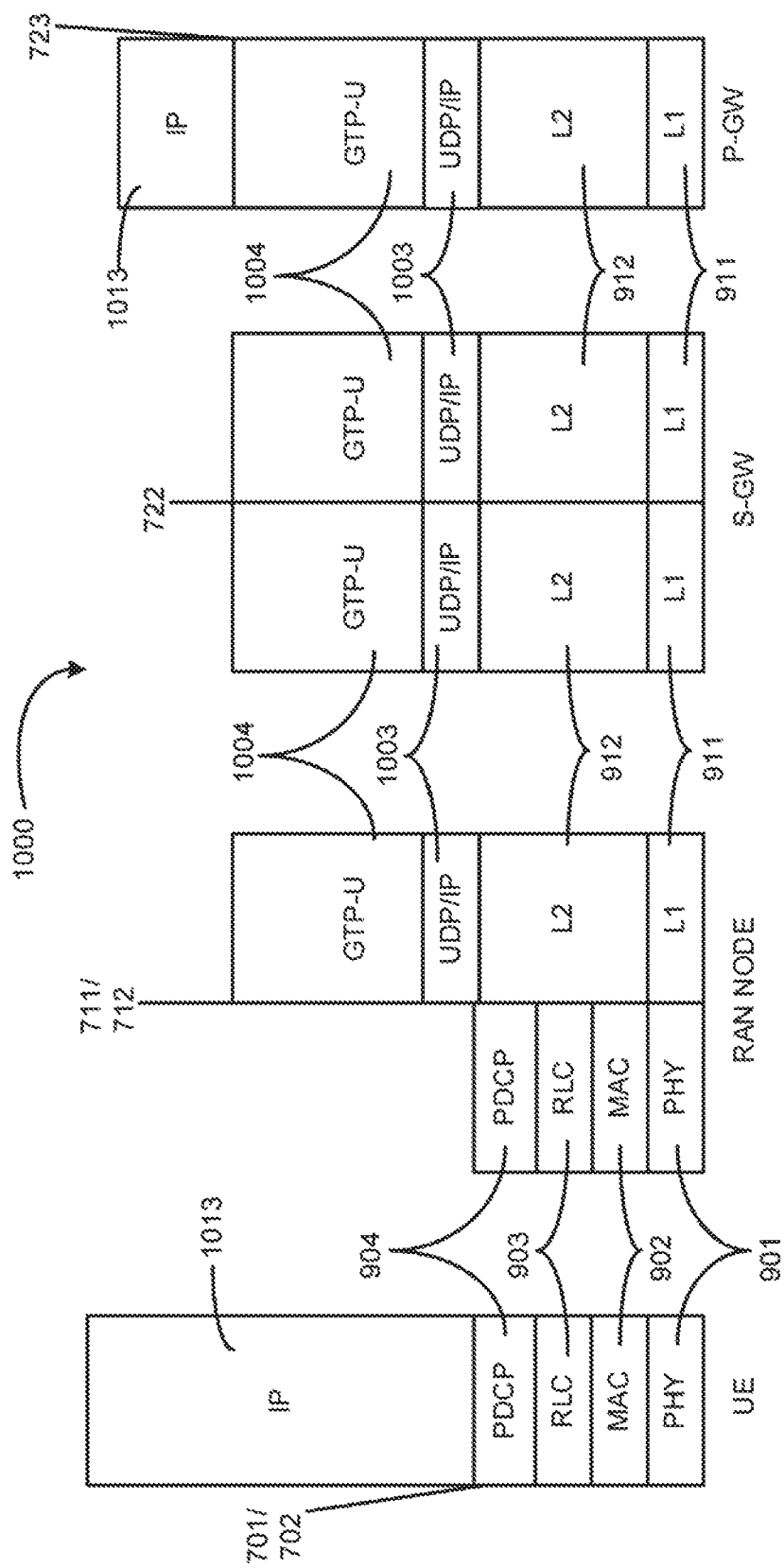
FIG. 10 illustrates a user plane protocol stack in accordance with some embodiments.

FIG. 10 is an illustration of a user plane protocol stack in accordance with some embodiments. In this embodiment, a user plane 1000 is shown as a communications protocol stack between the UE 501 (or alternatively, the UE 502), the RAN node 511 (or alternatively, the RAN node 512), the S-GW 522, and the P-GW 523. The user plane 1000 may utilize at least some of the same protocol layers as the control plane 900. For example, the UE 501 and the RAN node 511 may utilize a Uu interface (e.g., an LTE-Uu interface) to exchange user plane data via a protocol stack comprising the PHY layer 901, the MAC layer 902, the RLC layer 903, the PDCP layer 904.

The General Packet Radio Service (GPRS) Tunneling Protocol for the user plane (GTP-U) layer 1004 may be used for carrying user data within the GPRS core network and between the radio access network and the core network. The user data transported can be packets in any of IPv4, IPv6, or PPP formats, for example. The UDP and IP security (UDP/IP) layer 1003 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 911, the L2 layer 912, the UDP/IP layer 1003, and the GTP-U layer 1004. The S-GW 522 and the P-GW 523 may utilize an S5/S8a interface to exchange user plane data via a protocol stack comprising the L1 layer 911, the L2 layer 912, the UDP/IP layer 1003, and the GTP-U layer 1004. As discussed above with respect to FIG. 9, NAS protocols support the mobility of the UE 501 and the session management procedures to establish and maintain IP connectivity between the UE 501 and the P-GW 523.

Figure 11:
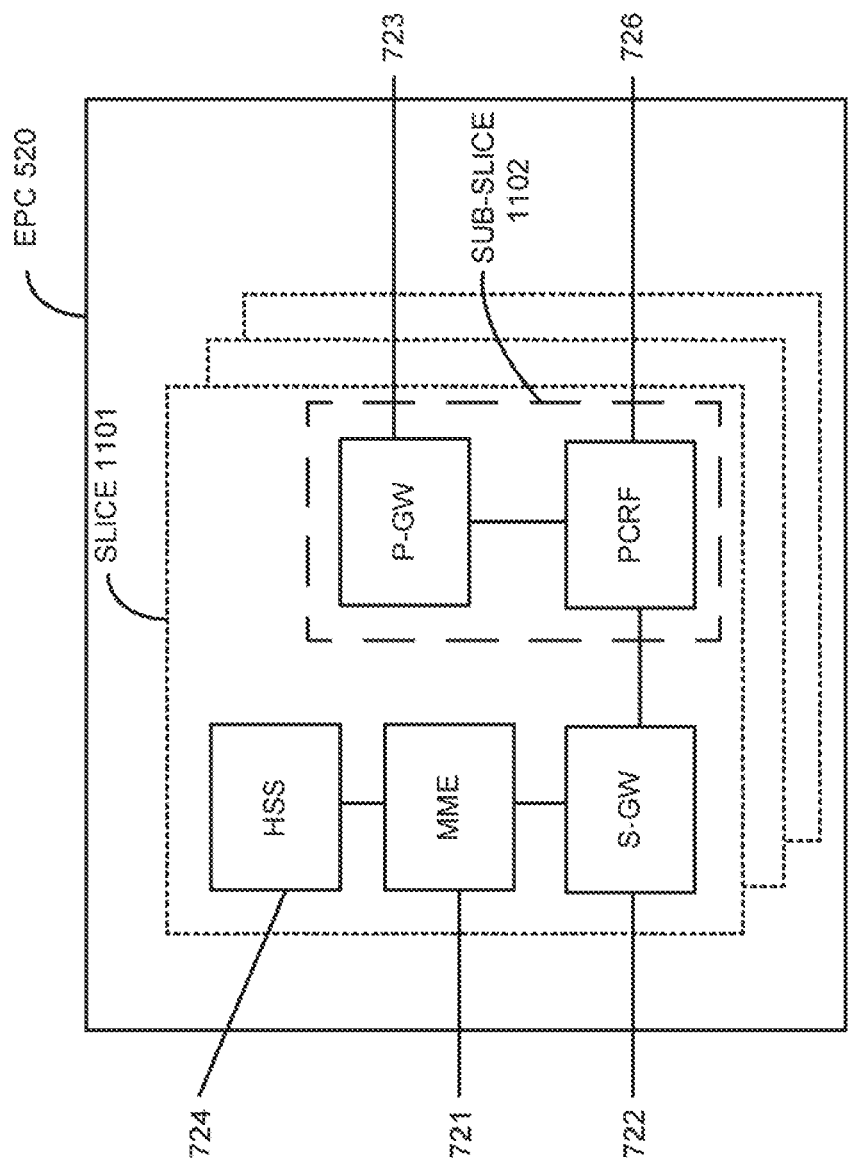
FIG. 11 illustrates components of a core network in accordance with some embodiments.

FIG. 11 illustrates components of a core network in accordance with some embodiments. The components of the CN 520 may be implemented in one physical node or separate physical nodes including components to read and execute instructions from a machine-readable or computer-readable medium (e.g., a non-transitory machine-readable storage medium). In embodiments, the components of CN 620 may be implemented in a same or similar manner as discussed herein with regard to the components of CN 520. In some embodiments, Network Functions Virtualization (NFV) is utilized to virtualize any or all of the above described network node functions via executable instructions stored in one or more computer readable storage mediums (described in further detail below). A logical instantiation of the CN 520 may be referred to as a network slice 1101. A logical instantiation of a portion of the CN 520 may be referred to as a network sub-slice 1102 (e.g., the network sub-slice 1102 is shown to include the PGW 523 and the PCRF 526).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 12:
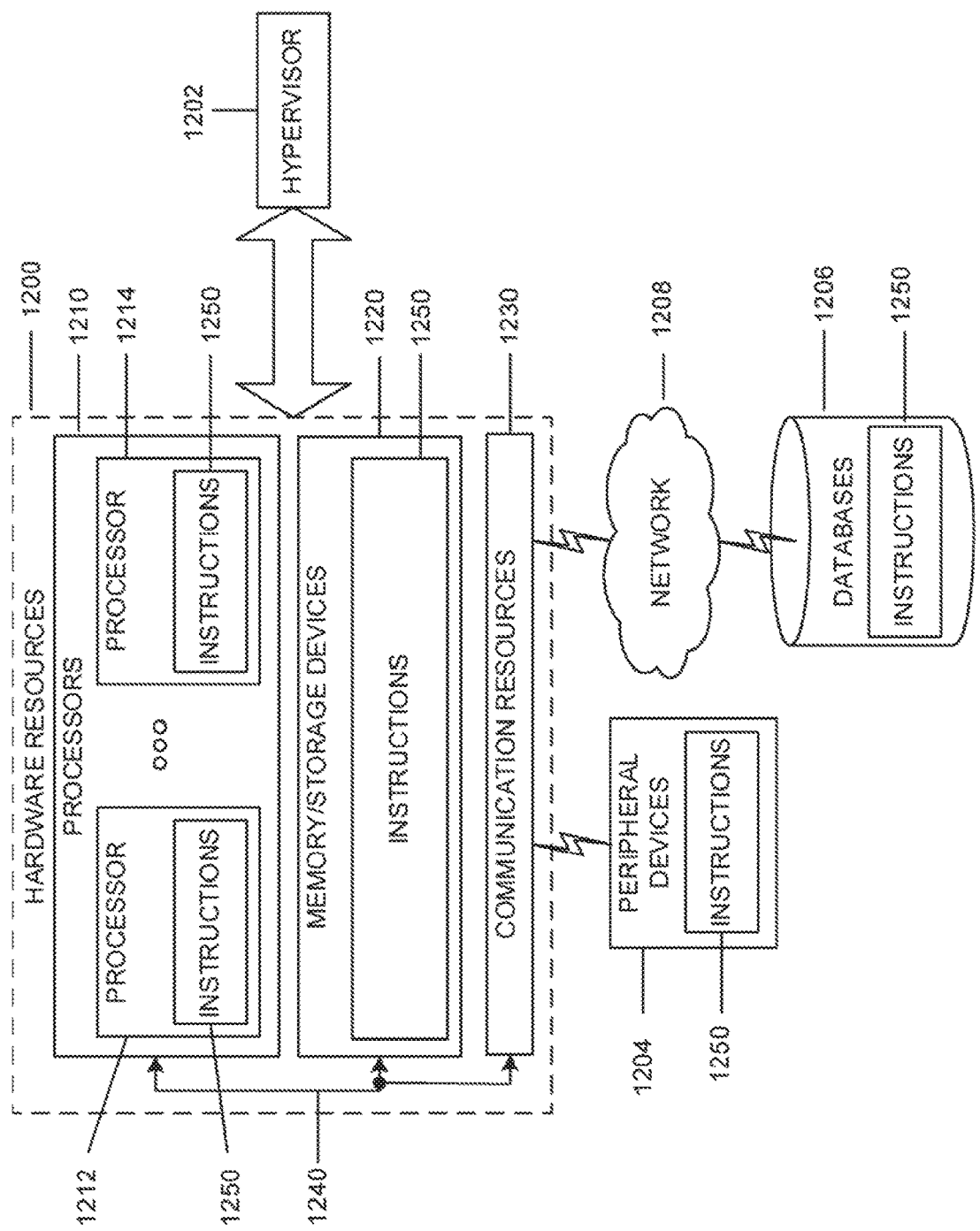
FIG. 12 is a block diagram illustrating components able to read and/or execute instructions from a machine-readable or computer-readable medium in accordance with some embodiments.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In some embodiments, the electronic device(s), network(s), system(s), chip(s) or component(s), or portions or implementations thereof, of any figure herein may be configured to perform one or more processes, techniques, or methods as described herein, or portions thereof.

EXAMPLES

Example 1 may include a method to enable Multi-Carrier Operation (MCO) for unlicensed enhanced Machine Type Communication (eMTC) system is provided, including some modalities on how to add/configure/reconfigure and activate Secondary Cell (SCell(s)) in these type of systems.

Example 2 may include the method of example 1 or some other example herein, wherein MCO is enabled by defining and allowing transmissions over a different set of data channels than the master set.

Example 3 may include the method of examples 1-2 or some other example herein, wherein the new set of channels includes additional anchor channels.

Example 4 may include the method of examples 1-2 or some other example herein, wherein the new set of channels can operate concurrently with the master set, or they can operate one at the time.

Example 5 may include the method of examples 1-2 or some other example herein, wherein the new set of channels is a shifted version in frequency of one contained in the master set, and the shift in frequency is indicated by a given offset value which is Radio Resource Control (RRC) configured or predefined.

Example 6 may include the method of examples 1-2 or some other examples herein, wherein the new set of channels is orthogonal to the master set.

Example 7 may include the method of examples 1-2 or some other example herein, wherein if the carriers collide with each other, and the collision is related to the anchor channel, the non-anchor channel carriers are dropped.

Example 8 may include the method of examples 1-2 or some other example herein, wherein in case non-anchor channels collide each other, it will be up to the eNB's implementation on how to schedule the channels and avoid collisions.

Example 9 may include the method of examples 1-2 or some other example herein, wherein one or more than a single set of channels can be defined and operated.

Example 10 may include the method of examples 1-2 or some other example herein, wherein the new set of channels is configured through RRC signaling, which might be User Equipment (UE) or cell-specifically configured.

Example 11 may include the method of example 1 or some other example herein, wherein MCO is enabled by operating one or more carriers within the hopping set.

Example 12 may include the method of examples 1 and 11 or some other example herein, wherein the additional carriers of operation are defined in a continuous manner in the adjacency of the channel in which the UE has hopped to.

Example 13 may include the method of examples 1 and 11 or some other example herein, wherein the additional carriers of operation are not defined in a contiguous manner, and always follow an offset value that is kept constant between hops, such that the operating carriers are always spaced apart equally, which is predefined or defined through RRC signaling which is UE or cell specifically defined.

Example 14 may include the method of examples 1 and 11 or some other example herein, wherein MCO is not enabled for those data channels that carry SI/paging, which can be find indicated within the anchor channel.

Example 15 may include the method of examples 1-14 or some other example herein, wherein the SCell can be activated either through a dedicated anchor channel, or through RRC signaling with only one anchor channel for both Primary Cell (PCell) and SCell.

Example 16 may include the method of examples 1-14 or some other example herein, wherein before activation of the SCell, the eNB provides to the UE a RRCConnectionReconfiguration message, through which the SCell is added/configured or reconfigured.

Example 17 may include the method of examples 1-14 and 16 or some other example herein, wherein compared to the legacy-LTE the RRCConnectionReconfiguration message can contain additional information such as the whitelist of the channels used by the SCell, or the frequency shift adopted over the whitelist for the PCell, the hyper-frame structure used in the data channels used by the SCell, if the hyper-frame structure is different than that for the PCell.

Example 18 may include the method of examples 1-14 and 16-17 or some other examples herein, wherein the SCell is activated via MAC CE, while deactivation is done via MAC CE and/or according to the expiration of a ScellDeactivationTimer.

Example 19 may include the method of examples 1-14 or some other examples herein, wherein the hopping sequence for the SCell can be derived from the knowledge of its PCI and SFN.

Example 20 may include the method of examples 1-14, 19, or some other examples herein, wherein the info related to the hopping sequence for the SCell are provided through broadcasting of SIB-x, which is transmitted in the data channel, and provides the remaining SIB information other than the essential SIB transmitted on the anchor.

Example 21 may include an apparatus to enable Multi-Carrier Operation (MCO) for unlicensed enhanced Machine-Type Communications (eMTC-U) systems, the apparatus comprising: means for performing an initial access to a network over one or more of three dedicated anchor channels; means for communicating data over a set of data channels using frequency hopping from one data channel to another data channel of the set of data channels, wherein a hopping sequence is based on whether or not a carrier sensing procedure succeeds over available ones of the set of data channels.

Example 22 may include the apparatus of example 21 or some other example herein, wherein MCO is enabled by defining and allowing transmissions over a new set of data channels different than a master set of data channels.

Example 23 may include the apparatus of example 22 or some other example herein, wherein the new set of channels includes additional anchor channels.

Example 24 may include the apparatus of examples 21-23 or some other example herein, wherein the new set of channels can operate concurrently with the master set, or the new set of channels can operate one at the time.

Example 25 may include the apparatus of examples 21-24 or some other example herein, wherein the new set of channels is a shifted version in frequency of one contained in the master set, and the shift in frequency is indicated by a given offset value which is RRC configured or predefined.

Example 26 may include the apparatus of examples 20-23 or some other examples herein, wherein the new set of channels is orthogonal to the master set.

Example 27 may include the apparatus of examples 19-24 or some other example herein, wherein if collisions among carriers of the set of channels are related to the anchor channel, non-anchor channel carriers are dropped.

Example 28 may include the apparatus of example 25 or some other example herein, wherein scheduling of the carriers of the non-anchor channels to avoid collisions is evolved NodeB (eNB)/next generation NodeB (gNB) implementation-specific.

Example 29 may include the apparatus of examples 19-26 or some other example herein, wherein one or more sets of channels are defined and operated.

Example 30 may include the apparatus of examples 20-27 or some other example herein, wherein the new set of channels is configured through Radio Resource Control (RRC) signaling, wherein the configuration is a User Equipment (UE)-specific configuration or a cell-specific configuration.

Example 31 may include the apparatus of example 19 or some other example herein, wherein MCO is enabled by operating one or more carriers within a hopping set.

Example 32 may include the apparatus of examples 19 and 29 or some other example herein, wherein additional carriers of operation are defined in a continuous manner in an adjacency of a channel in which a UE has hopped.

Example 33 may include the apparatus of examples 19 and 29 or some other example herein, wherein additional carriers of operation are not defined in a contiguous manner and follow an offset value that is kept constant between hops such that the operating carriers are always spaced apart equally, wherein the offset value is predefined or configured through RRC signaling, wherein the configuration is a UE-specific configuration or a cell-specific configuration.

Example 34 may include the apparatus of examples 19 and 29 or some other example herein, wherein MCO is not enabled for those data channels that carry System Information (SI) and/or paging, wherein the anchor channel is used to indicate the data channels that are not MCO enabled.

Example 35 may include the apparatus of examples 19-32 or some other example herein, wherein a Secondary Cell (SCell) is activated either through a dedicated anchor channel or through RRC signaling with only one anchor channel for both a Primary Cell (PCell) and the SCell.

Example 36 may include the apparatus of examples 19-32 or some other example herein, wherein before activation of the SCell, a RRCConnectionReconfiguration message is used to indicate that the SCell is to be added/configured or reconfigured.

Example 37 may include the apparatus of example 34 or some other example herein, wherein the RRCConnection- Reconfiguration message includes additional information such as a whitelist of channels used by the SCell, or a frequency shift adopted over the whitelist for the PCell, a hyper-frame structure used in the data channels used by the SCell when the hyper-frame structure is different than that for the PCell.

Example 38 may include the apparatus of examples 34-35 or some other examples herein, wherein the SCell is activated via Media Access Control (MAC) Control Element (CE), and deactivation is done via MAC CE and/or according to expiration of a ScellDeactivationTimer.

Example 39 may include the apparatus of examples 21-34 or some other examples herein, wherein the apparatus comprises: means for receiving a System Information Block (SIB)-x that is broadcasted over a data channel of the set of data channels, wherein the SIB-x includes information other than information that is included in an essential SIB that is obtained over an anchor channel of the one or more of three dedicated anchor channels; and means for determining a hopping sequence for an SCell using the information included in the SIB-x.

Example 40 may include the method of example 39 or some other examples herein, wherein the information included in the SIB-x comprises a Physical Cell Identify (PCI) of the SCell and a System Frame Number (SFN) of the SCell.

Example 41 may include the method of examples 21-40 or some other examples herein, wherein the apparatus is implemented in or by a User Equipment (UE) or a next generation NodeB (gNB).

Example 42 may include an apparatus comprising means to perform one or more elements of a method described in or related to any of examples 1-41, or any other method or process described herein.

Example 43 may include one or more non-transitory computer-readable medium comprising instructions to cause an electronic device, upon execution of the instructions by one or more processors of the electronic device, to perform one or more elements of a method described in or related to any of examples 1-41, or any other method or process described herein.

Example 44 may include an apparatus comprising logic, modules, or circuitry to perform one or more elements of a method described in or related to any of examples 1-41, or any other method or process described herein.

Example 45 may include a method, technique, or process as described in or related to any of examples 1-41, or portions or parts thereof.

Example 46 may include an apparatus comprising: one or more processors and one or more computer readable medium comprising instructions that, when executed by the one or more processors, cause the one or more processors to perform the method, techniques, or process as described in or related to any of examples 1-41, or portions thereof.

Example 47 may include a signal as described in or related to any of examples 1-41, or portions or parts thereof.

Example 48 may include a signal in a wireless network as shown and described herein.

Example 49 may include a method of communicating in a wireless network as shown and described herein.

Example 50 may include a system for providing wireless communication as shown and described herein.

Example 51 may include a device for providing wireless communication as shown and described herein.

Example 52 may include an apparatus configured to be employed in a User Equipment (UE), comprising: a memory interface; and processing circuitry configured to: perform an initial access to a network over one or more of three dedicated anchor channels; communicate data over a master set of data channels using frequency hopping from one data channel to another data channel of the master set of data channels, wherein a hopping sequence is based on whether or not a carrier sensing procedure succeeds over available ones of the set of data channels; enable a Multi-Carrier Operation (MCO) by defining and allowing transmissions over a new set of data channels different than the master set of data channels; and send the data to a memory via the memory interface.

Example 53 may include the apparatus of example 52 or some other example herein, wherein the new set of data channels is a shifted version in frequency of one contained in the master set, and the shift in frequency is indicated by a given offset value which is Radio Resource Control (RRC) configured or predefined.

Example 54 may include the apparatus of example 52 or some other example herein, wherein the new set of data channels is orthogonal to the master set.

Example 55 may include the apparatus of example 52 or some other example herein, wherein the new set of data channels is configured through RRC signaling, wherein the configuration is a UE-specific configuration or a cell-specific configuration.

Example 56 may include the apparatus of example 52 or some other example herein, wherein the MCO is enabled by operating one or more carriers within a hopping set.

Example 57 may include the apparatus of example 52 or some other example herein, wherein additional carriers of operation are defined in a continuous manner in the adjacency of the channel in which the UE has hopped to.

Example 58 may include the apparatus of example 52 or some other example herein, wherein additional carriers of operation are defined in a non-contiguous manner and follow an offset value that is kept constant between hops such that the operating carriers are always spaced apart equally, wherein the offset value is predefined or configured through RRC signaling, wherein the configuration is a UE-specific configuration or a cell-specific configuration.

Example 59 may include the apparatus of example 52 or some other example herein, wherein a Secondary Cell (SCell) is activated either through a dedicated anchor channel or through RRC signaling with only one anchor channel for both a Primary Cell (PCell) and the SCell.

Example 60 may include the apparatus of example 59 or some other example herein, wherein before activation of the SCell, a RRCConnectionReconfiguration message is used to indicate that the SCell is to be added/configured or reconfigured.

Example 61 may include the apparatus of example 60 or some other example herein, wherein the RRCConnectionReconfiguration message includes additional information, wherein the additional information comprises any one of a whitelist of channels used by the SCell, a frequency shift adopted over the whitelist for the PCell, and a hyper-frame structure used in the data channels used by the SCell when the hyper-frame structure is different than that for the PCell.

Example 62 may include the apparatus of example 61 or some other example herein, wherein the SCell is activated via Media Access Control (MAC) Control Element (CE), and deactivation is done via MAC CE and/or according to expiration of a ScellDeactivationTimer.

Example 63 may include the apparatus of example 59 or some other example herein, wherein the hopping sequence for the Scell is derived from Physical Cell Identify (PCI) of the Scell and a System Frame Number (SFN).

Example 64 may include the apparatus of example 63 or some other example herein, wherein the information related to the hopping sequence for the SCell is provided through broadcasting of System Information Block (SIB)-x, which is transmitted in the data channel, and provides the remaining SIB information other than the essential SIB transmitted on the anchor channel.

Example 65 may include a machine readable medium comprising instructions that, when executed, cause a User Equipment (UE) to: perform an initial access to a network over one or more of three dedicated anchor channels; communicate data over a master set of data channels using frequency hopping from one data channel to another data channel of the master set of data channels, wherein a hopping sequence is based on whether or not a carrier sensing procedure succeeds over available ones of the set of data channels; and enable a Multi-Carrier Operation (MCO) by defining and allowing transmissions over a new set of data channels different than the master set of data channels.

Example 66 may include the machine readable medium of example 65 or some other example herein, wherein the new set of data channels is a shifted version in frequency of one contained in the master set, and the shift in frequency is indicated by a given offset value which is Radio Resource Control (RRC) configured or predefined.

Example 67 may include the machine readable medium of example 65 or some other example herein, wherein the new set of data channels is orthogonal to the master set.

Example 68 may include the machine readable medium of example 65 or some other example herein, wherein the new set of data channels is configured through RRC signaling, wherein the configuration is a UE-specific configuration or a cell-specific configuration.

Example 69 may include the machine readable medium of example 65 or some other example herein, wherein the MCO is enabled by operating one or more carriers within a hopping set.

Example 70 may include the machine readable medium of example 65 or some other example herein, wherein additional carriers of operation are defined in a continuous manner in the adjacency of the channel in which the UE has hopped to.

Example 71 may include the machine readable medium of example 65 or some other example herein, wherein additional carriers of operation are defined in a non-contiguous manner and follow an offset value that is kept constant between hops such that the operating carriers are always spaced apart equally, wherein the offset value is predefined or configured through RRC signaling, wherein the configuration is a UE-specific configuration or a cell-specific configuration.

Example 72 may include the machine readable medium of example 65 or some other example herein, wherein a Secondary Cell (SCell) is activated either through a dedicated anchor channel or through RRC signaling with only one anchor channel for both a Primary Cell (PCell) and the SCell.

Example 73 may include the machine readable medium of example 72 or some other example herein, wherein before activation of the SCell, a RRCConnectionReconfiguration message is used to indicate that the SCell is to be added/configured or reconfigured.

Example 74 may include the machine readable medium of example 73 or some other example herein, wherein the RRCConnectionReconfiguration message includes additional information, wherein the additional information comprises any one of a whitelist of channels used by the SCell, a frequency shift adopted over the whitelist for the PCell, and a hyper-frame structure used in the data channels used by the SCell when the hyper-frame structure is different than that for the PCell.

Example 75 may include the machine readable medium of example 74 or some other example herein, wherein the SCell is activated via Media Access Control (MAC) Control Element (CE), and deactivation is done via MAC CE and/or according to expiration of a ScellDeactivationTimer.

Example 76 may include the machine readable medium of example 72 or some other example herein, wherein the hopping sequence for the Scell is derived from Physical Cell Identify (PCI) of the Scell and a System Frame Number (SFN).

Example 77 may include the machine readable medium of example 76 or some other example herein, wherein the information related to the hopping sequence for the SCell is provided through broadcasting of System Information Block (SIB)-x, which is transmitted in the data channel, and provides the remaining SIB information other than the essential SIB transmitted on the anchor channel.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An apparatus configured to be employed in a User Equipment (UE), comprising:
a processor configured to cause the UE to:
perform an initial access to a network over one or more of three dedicated anchor channels;
communicate data over a master set of data channels using frequency hopping from one data channel to another data channel of the master set of data channels, wherein a hopping sequence is based on whether or not a carrier sensing procedure succeeds over available ones of the set of data channels;
enable a Multi-Carrier Operation (MCO) by defining and allowing transmissions over a new set of data channels different than the master set of data channels; and
perform the transmission over the new set of data channels;
wherein a Secondary Cell (SCell) is activated either through a dedicated anchor channel or through Radio Resource Control (RRC) signaling with only one anchor channel for both a Primary Cell (PCell) and the SCell.

2. The apparatus of claim 1, wherein the new set of data channels is a shifted version in frequency of one contained in the master set, and the shift in frequency is indicated by a given offset value which is RRC configured or predefined.

3. The apparatus of claim 1, wherein the new set of data channels is orthogonal to the master set.

4. The apparatus of claim 1, wherein the MCO is enabled by operating one or more carriers within a hopping set.

5. The apparatus of claim 1, wherein additional carriers of operation are defined in a continuous manner in an adjacency of the channel to which the UE has hopped to.

6. The apparatus of claim 1, wherein additional carriers of operation are defined in a noncontiguous manner and follow an offset value that is kept constant between hops such that the operating carriers are always spaced apart equally, wherein the offset value is predefined or configured through RRC signaling, wherein the configuration is a UE-specific configuration or a cell-specific configuration.

7. The apparatus of claim 1, wherein before activation of the SCell, a RRCConnectionReconfiguration message is used to indicate that the SCell is to be added/configured or reconfigured, wherein the RRCConnectionReconfiguration message includes additional information, wherein the additional information comprises any one of a whitelist of channels used by the SCell, a frequency shift adopted over the whitelist for the PCell, and a hyper-frame structure used in data channels used by the SCell when the hyper-frame structure is different than that for the PCell.

8. The apparatus of claim 1, wherein the hopping sequence is derived from Physical Cell Identify (PCI) of the Scell and a System Frame Number (SFN).

9. The apparatus of claim 8, wherein information related to the hopping sequence is provided through broadcasting of System Information Block (SIB)-x, which is transmitted in the data channel, and provides a remaining SIB information other than essential SIB information transmitted on the anchor channel used for activation of the Scell channel.

10. A non-transitory machine readable medium comprising instructions that, when executed, cause a User Equipment (UE) to:
perform an initial access to a network over one or more of three dedicated anchor channels;
communicate data over a master set of data channels using frequency hopping from one data channel to another data channel of the master set of data channels, wherein a hopping sequence is based on whether or not a carrier sensing procedure succeeds over available ones of the set of data channels; and
enable a Multi-Carrier Operation (MCO) by defining and allowing transmissions over a new set of data channels different than the master set of data channels;
wherein a Secondary Cell (SCell) is activated either through a dedicated anchor channel or through Radio Resource Control (RRC) signaling with only one anchor channel for both a Primary Cell (PCell) and the SCell.

11. The non-transitory machine readable medium of claim 10, wherein the new set of data channels is a shifted version in frequency of one contained in the master set, and the shift in frequency is indicated by a given offset value which is RRC configured or predefined.

12. The non-transitory machine readable medium of claim 10, wherein the new set of data channels is orthogonal to the master set.

13. The non-transitory machine readable medium of claim 10, wherein the MCO is enabled by operating one or more carriers within a hopping set.

14. The non-transitory machine readable medium of claim 10, wherein additional carriers of operation are defined in a continuous manner in an adjacency of the channel to which the UE has hopped to.

15. The non-transitory machine readable medium of claim 10, wherein additional carriers of operation are defined in a non-contiguous manner and follow an offset value that is kept constant between hops such that the operating carriers are always spaced apart equally, wherein the offset value is predefined or configured through RRC signaling, wherein the configuration is a UE-specific configuration or a cell-specific configuration.

16. The non-transitory machine readable medium of claim 10, wherein before activation of the SCell, a RRCConnectionReconfiguration message is used to indicate that the SCell is to be added/configured or reconfigured, wherein the RRCConnectionReconfiguration message includes additional information, wherein the additional information comprises any one of a whitelist of channels used by the SCell, a frequency shift adopted over the whitelist for the PCell, and a hyper-frame structure used in data channels used by the SCell when the hyper-frame structure is different than that for the PCelL.

17. The non-transitory machine readable medium of claim 10, wherein the hopping sequence is derived from Physical Cell Identify (PCI) of the Scell and a System Frame Number (SFN).

18. The non-transitory machine readable medium of claim 17, wherein the information related to the hopping sequence is provided through broadcasting of System Information Block (SIB)-x, which is transmitted in the data channel, and provides a remaining SIB information other than essential SIB information transmitted on the anchor channel used for activation of the Scell channel.

19. A User Equipment (UE), comprising:
wireless communication circuitry; and
one or more processors coupled to the wireless communication circuitry, wherein the one or more processors are configured to cause the UE to:
perform an initial access to a network over one or more of three dedicated anchor channels;
communicate data over a master set of data channels using frequency hopping from one data channel to another data channel of the master set of data channels, wherein a hopping sequence is based on whether or not a carrier sensing procedure succeeds over available ones of the set of data channels;
enable a Multi-Carrier Operation (MCO) by defining and allowing transmissions over a new set of data channels different than the master set of data channels; and
perform the transmission over the new set of data channels;
wherein a Secondary Cell (SCell) is activated either through a dedicated anchor channel or through Radio Resource Control (RRC) signaling with only one anchor channel for both a Primary Cell (PCell) and the SCell.

20. The UE of claim 19, wherein the new set of data channels is a shifted version in frequency of one contained in the master set, and the shift in frequency is indicated by a given offset value which is RRC configured or predefined.

* * * * *